3,503,911
ADHESIVE FOR POLYETHYLENE AND PROCESS FOR ITS PREPARATION AND APPLICATION
Neuman Goldemberg, Cal. Grivitei 163; Emilia Simionescu, Cal. Rahovei 148; Mihaela Mateescu, Str. Liveni 47; and Maria Canahai, Cal. Calarasi 38, all of Bucharest, Rumania
No Drawing. Filed Nov. 23, 1966, Ser. No. 596,460
Int. Cl. C09j 3/12, 3/26
U.S. Cl. 260—23　　　　　　　　　　　　　　5 Claims

ABSTRACT OF THE DISCLOSURE

An adhesive for polyethylene which does not require vulcanization and consists essentially of an isobutylene-isoprene copolymer containing 95% to 98% isobutylene and 2 to 5% isoprene which also includes 8 to 20% resinous natural rosin, fillers and plasticizers.

---

The invention relates to a process for the preparation and application of an adhesive based on modified elastomers for bonding polyethylene to diverse materials, such as: paper, textiles, metal, plastics, concrete, etc.

At the present state of the adhesion technique, there is known a process for the manufacture of an adhesive based on copolymers containing 85 to 99.5% isoolefins with 4 to 7 carbon atoms and 0.5 to 15% diolefins, perferably isoprene, to which fillers, plasticizers and accelerators are added. It is applied as is customary, the application being followed by vulcanization.

The principal disadvantage of this adhesive is that bonding is carried out by vulcanization and it is the object of this invention to provide an adhesive which avoids this step.

The process according to this invention eliminates this disadvantage. There is provided a method for the manufacture and application of a non-vulcanizable adhesive based on copolymers of isobutylene and isoprene, containing 95 to 98% isobutylene and 2 to 5% isoprene, and modified with 8 to 20% natural resins of rosin type, and charged with filters and plasticisers. The adhesive obtained may be utilised in form of adhesive solution or adhesive tape applied on polyethylene, polyvinyl chloride, paper and other surfaces.

The invention is illustrated by the following six examples in which the term "parts" indicates parts by weight:

EXAMPLE 1

90 parts of isobutylene-isoprene copolymer and 30 parts carbon black are mixed 20 minutes on a roll-mill, then 1.5 parts stearin and 3.5 parts zinc oxide are introduced, and mixing is continued for five more minutes. During another 10 minutes of mixing on the roll-mill, 12 parts of mineral oil are added, followed by 20 parts of carbon black, and mixing is continued for ten more minutes. Then, during another 5 minutes of mixing on the roll-mill 10 parts of rosin and 5 parts of oil are added. The mixture obtained is introduced into a mixer, 5 parts of toluene for 1 part of mixture are added, and the mixture is homogenized.

The adhesive obtained is applied with a brush on paper laminated with polyethylene, or is empolyed in automatic devices for manufacture of paper-polyethylene packaging. Bonding is carired out at room temperature by a light pressure, peel strength being 1.700 to 1.850 kg./cm.

EXAMPLE 2

The process is carried out in the same way as in Example 1, with the difference that the mixture resulting after rolling contains:

|  | Parts |
|---|---|
| Isobutylene-isoprene copolymer | 95 |
| Carbon black | 60 |
| Stearin | 2 |
| Zinc oxide | 4 |
| Mineral oil | 12 |
| Rosin | 10 |

The mixture is dissolved in gasoline at the ratio the gasoline to the mixture of 4:1. The adhesive obtained is applied with a brush on a toluene-degreased polyethylene sheet. After 5 to 10 minutes of evaporation, the two sheets are bonded at room temperature by light pressure with the aid of a roll. Shear strengths of 1.350 to 1.450 kg./cm.$^2$ are attained.

EXAMPLE 3

The process is the same as in Example 1, with the difference that the mixture rolled out contains:

|  | Parts |
|---|---|
| Isobutylene-isoprene copolymer | 95 |
| Carbon black | 55 |
| Stearin | 2 |
| Zinc oxide | 5 |
| Chlorinated paraffin | 8 |
| Rosin | 10 |

The mixture obtained is dissolved in toluene with a ratio of toluene to the mixture of 3:1. The adhesive resulting can be used for application at room temperature on polyethylene pipes to be joined. Shear strengths obtained are between 1.200 and 1.500 kg./cm.$^2$.

EXAMPLE 4

The process is carried out as in Example 2, with the difference that the application of the adhesive is made with a specific device, which assures the uniformity of the bond line thickness on the polyethylene or polyvinyl chloride sheet. Adhesive tapes are obtained which are useful for the external protection of buried metallic pipes.

EXAMPLE 5

The process is the same as in Example 3, and the adhesive obtained is applied with a brush on concrete and on the polyethylene sheet to be bonded to it, and which has been previously degreased with toluene. An adherence of polyethylene to concrete of 0.900 to 1.200 kg./cm.$^2$ is attained.

EXAMPLE 6

The process is carried out as in Example 1, with the difference that the following mixture is rolled:

|  | Parts |
|---|---|
| Isobutylene-isoprene copolymer | 90 |
| Ultrasil VN$_3$ | 63 |
| Stearin | 1.5 |
| Zinc oxide | 3 |
| Mineral oil | 10 |
| Rosin | 12 |

The mixture is obtained in form of a paste of the consistency of a masterbatch and is applied by calendering on polyethylene or plastified polyvinyl chloride sheet. An adhesive tape is obtained, which applied at room temperature on a mechanically cleaned and degreased metal, has peel strengths up to 0.750–1.000 kg./cm.

The process according to this invention offers the following advantages:

The adhesive is non-vulcanizable and can be used at temperatures from −20° C. up to +80° C.;

The application of the adhesive is carried out at room temperature and by simple processes;

The adhesive may be used for bonding polyethylene to diverse materials, such as: paper, textiles, metal, plastics, foams, concrete, etc.;

The adhesive may suffer repeated bonding and removing.

What we claim is:

1. A nonvulcanizing adhesive for bonding polyethylene to itself, other plastics, paper, metal, textiles, concrete and the like consisting essentially of a solution in paraffinic, aromatic or chlorinated hydrocarbon solvent of an isobutylene-isoprene copolymer consisting of 95 to 98% by weight isobutylene and 2 to 5% by weight isoprene, 8 to 20 parts by weight resinous natural rosin per 100 parts by weight of said copolymer and combined as a modifier therewith, 45 to 70 parts by weight carbon black or colloidal silica per 100 parts by weight of said copolymer and mixed with the modified copolymer, about 5 to 6 parts by weight zinc oxide, 0 to 100 parts by weight chlorinated paraffin per 100 parts by weight of said copolymer, and 10 to 20 parts by weight mineral oil or naphthenic acids per 100 parts by weight of said copolymer, said adhesive being selected from the group which consists of:

90 parts by weight of said isobutylene-isoprene copolymer, 63 parts by weight of said colloidal silica, 1.5 parts by weight stearin, 3 parts by weight zinc oxide, 10 parts by weight mineral oil and 12 parts by weight of said rosin; 95 parts by weight of said copolymer, 60 parts by weight carbon black, 2 parts by weight stearin, 4 parts by weight zinc oxide, 12 parts by weight mineral oil and 10 parts by weight rosin; 95 parts by weight of said copolymer, 55 parts by weight of carbon black, 2 parts by weight stearin, 5 parts by weight zinc oxide, 8 parts by weight chlorinated paraffin and 10 parts by weight of said rosin; and 90 parts by weight of said copolymer, 50 parts by weight carbon black, 1.5 parts by weight stearin, 3.5 parts by weight zinc oxide, 17 parts by weight mineral oil and 10 parts by weight of said rosin.

2. The nonvulcanizing adhesive as defined in claim 1 wherein the adhesive consists of 90 parts by weight of said isobutylene-isoprene copolymer, 63 parts by weight of said colloidal silica, 1.5 parts by weight stearin, 3 parts by weight zinc oxide, 10 parts by weight mineral oil and 12 parts by weight of said rosin.

3. The nonvulcanizing adhesive as defined in claim 1 which consists of 95 parts by weight of said copolymer, 60 parts by weight carbon black, 2 parts by weight stearin, 4 parts by weight zinc oxide, 12 parts by weight mineral oil and 10 parts by weight rosin.

4. The nonvulcanizing adhesive as defined in claim 1 which consists of 95 parts by weight of said copolymer, 55 parts by weight of carbon black, 2 parts by weight stearin, 5 parts by weight zinc oxide, 8 parts by weight chlorinated paraffin and 10 parts by weight of said rosin.

5. The nonvulcanizing adhesive as defined in claim 1 which consists of 90 parts by weight of said copolymer, 50 parts by weight carbon black, 1.5 parts by weight stearin, 3.5 parts by weight zinc oxide, 17 parts by weight mineral oil and 10 parts by weight of said rosin.

References Cited

UNITED STATES PATENTS 2,790,732   4/1957   McGarry et al. _____ 260—25

OTHER REFERENCES

Skeist, I,: "Handbook of Adhesives," 1962, TP 968 S 5 C. 2 (pp. 221 to 228 relied on).

DONALD E. CZAJA, Primary Examiner

W. E. PARKER, Assistant Examiner

U.S. Cl. X.R.

117—122, 161, 167, 168; 156—334; 161—182, 247; 260—41, 33.6